March 6, 1928.
H. PIEPER
BRAKING DEVICE FOR VEHICLES
Filed April 15, 1926
1,661,623
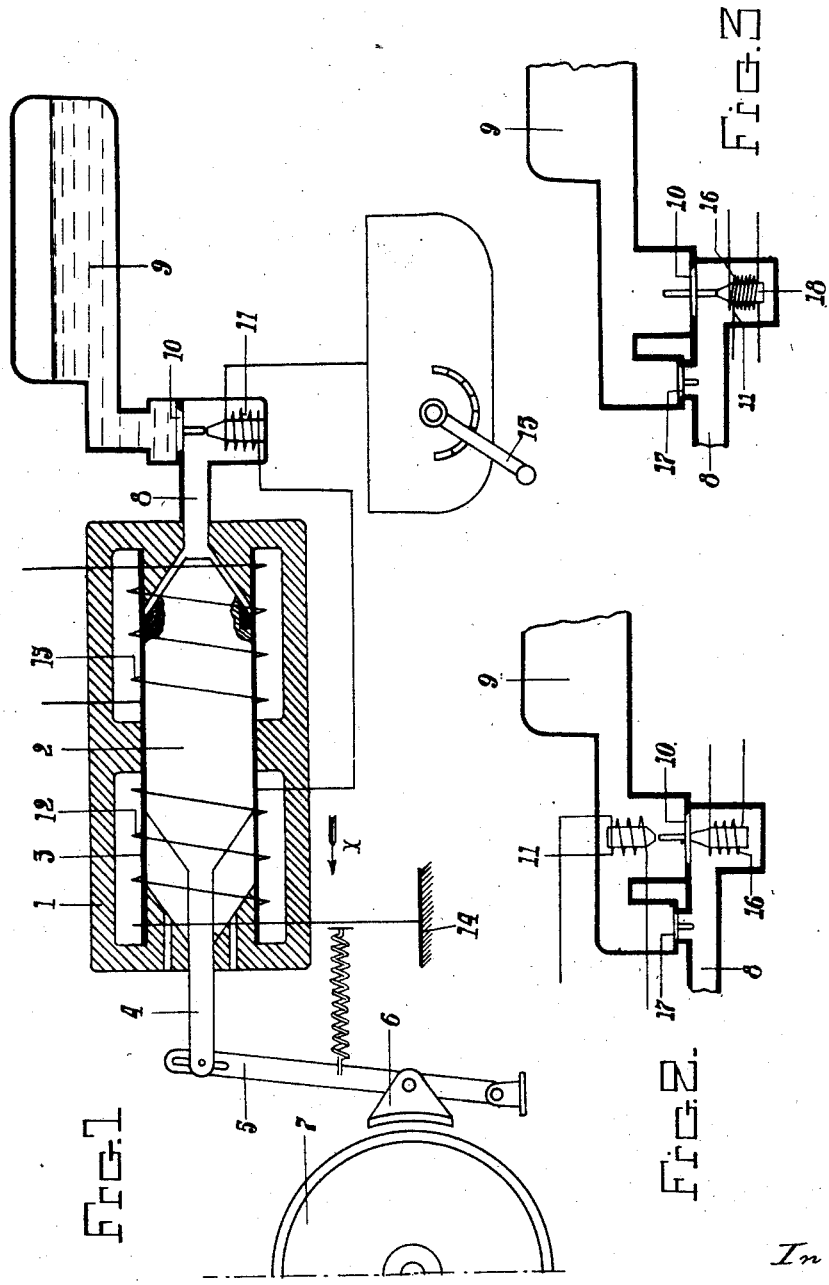
Inventor
Henri Pieper Patented Mar. 6, 1928.

1,661,623

UNITED STATES PATENT OFFICE.

HENRI PIEPER, OF BRUSSELS, BELGIUM, ASSIGNOR TO COMPAGNIE INTERNATIONALE DES FREINS AUTOMATIQUES, SOCIETE ANONYME, OF LIEGE, BELGIUM.

BRAKING DEVICE FOR VEHICLES.

Application filed April 15, 1926, Serial No. 102,182, and in Belgium October 5, 1925.

It is known that the coefficient of friction of the brake shoes upon the tires of wheels decreases as the speed increases. Consequently, if it is desired to obtain the maximum braking, it is necessary to apply an intense braking force when the vehicle is travelling at high speed and to decrease this braking force in proportion as the speed decreases until a relatively low value is reached which is sufficient to maintain the vehicle at rest upon a given gradient.

With the known brake controlling devices it is difficult to obtain this result, for if the braking force exceeds a certain value the wheels become jammed and it is necessary to release the brakes to enable them to be put into movement again.

The drive of the vehicle must consequently, in order to avoid this jamming, keep well below the maximum braking force which could be exerted upon the wheels without causing them to jam, so that it is not possible to make use of the maximum efficiency of the braking device.

The object of the present invention is to remove these various disadvantages by means of a device preventing the jamming of the wheels and allowing, nevertheless, the maximum braking to be obtained.

For this purpose the braking force may be produced on the one hand by the core of a solenoid excited by the current from a generator actuated by the vehicle or by the motors of the vehicle working as generators, and on the other hand by the core of a second solenoid subjected to the action of a fluid under pressure; the release of the brake being produced by cutting off the current from the generator or the motor mentioned above and exciting the second solenoid by a current existing upon the vehicle.

These two braking systems may be employed either at the same time or separately, that is to say one to the exclusion of the other or the one completing, after a certain period of braking has elapsed, the braking force exerted by the other.

The force produced by the fluid under pressure may for example be established in such a way as to correspond to a normal braking action at low speeds, the complementary braking action for high speeds being obtained by the action of the core displaced by the solenoid which is excited by the current from the motors of the vehicle working as generators.

The result obtained from this arrangement is that the braking force reaches the maximum at high speeds and decreases in proportion as the speed decreases, since the strength of the current furnished by the motors falls; the braking force, when the vehicle is brought to rest, corresponding to the force exerted by the fluid under pressure.

The entry into action of the solenoid excited by the current of the motors of the vehicle working as generators, as well the admission of the fluid under pressure against the core of the second solenoid, may be controlled either by two hand levers which are actuated separately by or employing a single hand lever which may be the lever of the main controller which controls the electric motors of the vehicle.

In the case of a single hand lever the valve controlling the admission of fluid under pressure towards the above mentioned core of the second solenoid is automatic and opens towards the vessel containing the fluid under pressure by the action of an electromagnet interposed in the circuit of the solenoid excited by the current from the motors of the vehicle working as generators.

By means of this arrangement the hydraulic brake will thus enter into action directly, while the electric brake may be graduated by interposing more or less resistance in the circuit.

The bringing back of the lever of the controller to the zero point of its dial will have the effect on the one hand of breaking the circuit of the solenoid supplied by the motors of the vehicle and on the other hand of putting into circuit the solenoid acting upon the core which has previously received the pressure of the fluid under pressure.

The effect of putting this second solenoid into circuit is to release the brake by moving the core back in an opposite direction and consequently forcing the fluid under pressure back into its containing vessel.

In the case of trains composed of a power driven vehicle and several trailer vehicles the brake may be rendered automatic in the event of a break occurring in the coupling. With this object in view the invention provides for another form of construction in which the valve controlling the admission of the fluid under pressure upon the core of the second solenoid mentioned above is normally kept closed against the action of the said fluid contained in the vessel under pressure by the core of an electromagnet constantly excited by the current existing upon the power driven vehicle and running throughout the whole length of the train.

The said valve may however be opened during braking operations by a second electromagnet acting upon the valve in an opposite direction to the first and interposed in the electric braking circuit.

According to a particular advantageous form of construction the two above mentioned solenoids may advantageously be combined into one single one with a double magnetic circuit acting upon a single core resulting from the combination of the two above mentioned cores; this single core thus co-operating in the electric braking and in the pneumatic braking operations.

Other characteristic features of the invention will stand out from the description hereinafter given with reference to the accompanying diagrammatic drawings given by way of example.

In these drawings:—

Figure 1 shows diagrammatically a form of a brake actuating mechanism constructed according to the invention.

Figures 2 and 3 show diagrammatically two modified forms of a part of the control mechanism.

In the form illustrated in Figure 1 use is made of a single solenoid 1 with a double magnetic circuit, comprising a single core 2 moving in a tube 3 of non-magnetic metal and serving as a guide cylinder for the core 2.

The said core is connected at its front part to a rod 4 which acts upon the brake mechanism, shown diagrammatically in the drawings by a pivotally mounted lever 5 carrying the brake shoe 6 which acts upon the wheel 7 of the vehicle.

The rear part of the cylinder 3 is placed in communication, through a duct 8, with a vessel 9 containing a fluid under pressure, such as oil; the said duct 9 comprising, at a suitable point, an automatic valve 10 normally held upon its seat by the pressure of the fluid contained in the vessel 9, which valve is adapted to be opened by the action of an electromagnet 11.

The solenoid 1 comprises two windings 12 and 13, the purpose of which is to actuate the core 2 in the direction of the arrow X and in the opposite direction to the latter respectively. The winding 12 is connected on the one hand to ground, as indicated at 14 and on the other hand to the positive terminal of a generator actuated by the vehicle; which generator may be formed by the motor of the vehicle itself working as a generator. The winding 13 is also connected to any source of current whatever provided upon the vehicle or to the source of current supplying the vehicle in the case of electric railways or tramways.

It will be seen that with this arrangement the braking action may be obtained on the one hand by the electromagnetic action exerted by the winding 12 upon the core 2 and on the other hand by the hydraulic action exerted in the same direction by the fluid under pressure contained in the vessel 9 acting on the rear part of the core 2, this intervention of the said fluid under pressure being controlled by the raising of the valve 10. The release of the brakes is then effected on the one hand by breaking the current in the circuit supplying the winding 12 and on the other hand by exciting the winding 13 in such a way that the force thus produced will be sufficient to bring back again the core 2, eventually forcing back into the vessel 9 the fluid under pressure which had been admitted at the rear of the core 2. Naturally the exciting of the windings 12 and 13 and the putting into circuit of the electromagnet 11 may be effected by separate controls.

The invention provides however for the control of these various members by the single hand lever 15 of the main controller of the motors of the vehicle.

For this purpose the electromagnet 11 is connected in series with the winding 12, and the winding 13 is provided with a contact stud abutting upon the sector of the controller in such a manner that the actuation of the lever 15 produces the excitation of the said winding when the lever is brought back into the neighbourhood of the zero mark.

With this method of connection the electric brake and the hydraulic brake will act simultaneously. It goes without saying, however, that the intensity of the electric braking action may be reduced by connecting in the circuit of the winding 12 a varying number of resistances in such a way that the braking action is obtained, when the vehicle is travelling at mean speed, practically only by the action of the fluid under pressure upon the core 2, the braking force being subsequently increased if desired by decreasing the resistances connected in the circuit supplying the winding 12.

In the form of construction described above the hydraulic braking and the electric braking operations are effected simultaneously.

Naturally these two braking operations may be obtained separately; that is to say, one to the exclusion of the other or one after the other. One of the braking operations may for example be employed for low speeds of the vehicle, i. e., for normal braking operations, the other braking action being added to it in cases of emergency. In other words, the hydraulic braking action may, for instance, be employed for normal braking and may be completed by the electric braking action in case of emergency.

It will be understood that various combinations of the method of employment of these two braking actions may be obtained either by employing several controlling devices or by employing only one single control lever, for example the lever of the main controller of the motor of the vehicle on condition that these different control members of the two brakes are connected by circuits judiciously chosen; but as the choice of these circuits is within the technical knowledge of all persons skilled in the art, it is not considered of use to give herein a description of each of the circuits which will be necessary for effecting the different combinations of the two brake systems mentioned above.

In the case of a train of vehicles composed of a power driven vehicle and several trailer vehicles the brake described above may be rendered automatic in order to obviate breaks in the coupling.

For this purpose the method of opening the valve 10 and also its control are modified.

Figure 2 shows one construction based on this principle in which the valve 10, which is adapted to open under the pressure of the fluid contained in the vessel 9, is on the other hand maintained normally closed by the action of an electromagnet 16 supplied by a current extending along the different vehicles composing the train.

The valve 10 may also be opened by an electromagnet 11 of higher power than the electromagnet 16, interposed in the excitation circuit of the electric brake. When release takes place the fluid under pressure may be forced into the vessel 9 on account of the provision of an automatic valve 17 opening towards the latter.

The modification shown in Figure 3 is based upon the same principle as that shown in Figure 2. It only differs from the latter in that the core 18 of the electromagnet 16 which normally keeps the valve 10 closed may be actuated in the opposite direction by the electromagnet 11 of greater power than the other.

What I claim is:

1. Brake-operating apparatus for vehicles, embodying an electromagnetic device comprising a magnetic field traversed by a magnetic flux created by a solenoid which is excited by current from the vehicle and which shifts in braking direction a core disposed in said field; and a second magnetic field traversed by a magnetic flux created by a second solenoid also excited by current from the vehicle and shifting in brake-releasing direction a core disposed in the second field, said core being shifted in braking direction by the action of a fluid under pressure.

2. Brake-operating apparatus, according to claim 1, in which the two cores are joined together.

3. Brake-operating apparatus for vehicles, in which the brake mechanism is connected with two solenoid cores disposed in alignment with each other and subjected to the action of two magnetic fields acting in opposite directions, said cores moving in a non-magnetic metal tube or cylinder communicating with a reservoir containing a fluid under pressure.

4. Brake-operating apparatus for vehicles, embodying an electromagnetic device comprising a magnetic field traversed by a magnetic flux created by a solenoid which is excited by current from the vehicle and which shifts in braking direction a core disposed in said field; a second magnetic field traversed by a magnetic flux created by a second solenoid also excited by current from the vehicle and shifting in brake-releasing direction a core disposed in the second field, said core being shifted in braking direction by a fluid under pressure coming from a reservoir through a duct; an automatic valve for controlling said duct opening toward said reservoir; and an electromagnet for operating said valve interposed in the excitation circuit of the first solenoid.

5. Brake-operating apparatus for vehicles, embodying an electromagnetic device comprising a magnetic field traversed by a magnetic flux created by a solenoid which is excited by current from the vehicle and which shifts in braking direction a core disposed in said field; a second magnetic field traversed by a magnetic flux created by a second solenoid also excited by current from the vehicle and shifting in brake-releasing direction a core disposed in the second field, said core being shifted in braking direction by a fluid under pressure coming from a reservoir through a duct; a valve for controlling said duct normally closed against the pressure of the fluid in the reservoir by the action of an electromagnet likewise excited by current from the vehicle; and a second electromagnet of higher power than the first one for opening said valve and which is interposed in the excitation circuit of the first solenoid; said duct having a branch with an automatic valve therein which opens towards the reservoir.

6. Brake-operating apparatus for vehicles, embodying an electromagnetic device comprising a magnetic field traversed by a magnetic flux created by a solenoid which is excited by current from the vehicle and which shifts in braking direction a core disposed in said field; a second magnetic field traversed by a magnetic flux created by a second solenoid also excited by current from the vehicle and shifting in brake-releasing direction a core disposed in the second field, said core being shifted in braking direction by a fluid under pressure coming from a reservoir through a duct; a valve for controlling said duct normally closed against the pressure of the fluid in the reservoir; and a single electromagnet for controlling said valve excited by two windings, the first of which closes the valve and is excited by current from the vehicle, the second winding being of higher power than the first one and being interposed in the circuit of the first solenoid; said duct having a branch with an automatic valve therein which opens towards the reservoir.

7. Brake-operating apparatus for a vehicle driven by electric motors, embodying an electromagnetic device comprising a magnetic field traversed by a magnetic flux created by a solenoid which is excited by current from the vehicle and which shifts in braking direction a core disposed in said field; a second magnetic field traversed by a magnetic flux created by a second solenoid also excited by current from the vehicle and shifting in brake-releasing direction a core disposed in the second field, said core being shifted in braking direction by a fluid under pressure coming from a reservoir through a duct; and a normally closed valve for controlling said duct opened by the action of an electromagnet interposed in the excitation circuit of the first solenoid, the said first solenoid being connected to the motors to be energized thereby under the control of the lever of the main control when said motors function as generators.

In testimony whereof I affix my signature.

HENRI PIEPER.